United States Patent [19]
Yero

[11] Patent Number: 5,969,961
[45] Date of Patent: Oct. 19, 1999

[54] LOAD PUMP TYPE OF VOLTAGE GENERATOR CIRCUIT

[75] Inventor: Emilio Miguel Yero, Aix En Provence, France

[73] Assignee: SGS-Thomson Microelectronics S.A., Gentilly, France

[21] Appl. No.: 09/059,088

[22] Filed: Apr. 13, 1998

[30] Foreign Application Priority Data

Apr. 16, 1997 [FR] France ................................. 97 04928

[51] Int. Cl.⁶ ........................................... H02M 3/07
[52] U.S. Cl. ............................................ 363/60; 363/65
[58] Field of Search ................... 363/59, 60, 65

[56] References Cited

U.S. PATENT DOCUMENTS

| | | | |
|---|---|---|---|
| 4,485,433 | 11/1984 | Topish | 363/65 |
| 4,839,787 | 6/1989 | Kojima et al. | 363/60 |
| 5,077,691 | 12/1991 | Haddad et al. | 365/218 |
| 5,280,420 | 1/1994 | Rapp | 363/59 |
| 5,767,735 | 6/1998 | Javaniford et al. | 363/60 |

FOREIGN PATENT DOCUMENTS 0 292269A2  11/1988  European Pat. Off. ......... H02M 3/07
0 590827A2  4/1994   European Pat. Off. ......... G11C 5/14

OTHER PUBLICATIONS

Patent Abstracts of Japan, vol. 96, No. 4, Apr. 30, 1996, Publication No. 07322604, Publication date Dec. 8, 1995.

Patent Abstracts of Japan, vol. 96, No. 6, Jun. 28, 1996, Publication No. 08033321, Publication date Feb. 2, 1996.

*Primary Examiner*—Jeffrey Sterrett
*Attorney, Agent, or Firm*—Gunster, Yoakley, Valdes-Fauli & Stewart, P.A.; Michael J. Buchenhorner

[57] ABSTRACT

Disclosed is a load pump type of voltage generator circuit designed to produce several levels of voltage higher than a supply voltage of the circuit. The circuit comprises two cascades of elementary pumping cells. Each cell is controlled by at least one driving signal. To make the two cascades work together, it is planned to modify the driving signal or one of the driving signals assigned to the last cell of the first cascade in such a way that the first cascade delivers a voltage equal to the sum of the voltages delivered by the two cascades. In a particular embodiment, the two cascades comprise the same number of cells and can work in parallel. Application to the field of non-volatile memories for the production of read and write voltages.

13 Claims, 5 Drawing Sheets

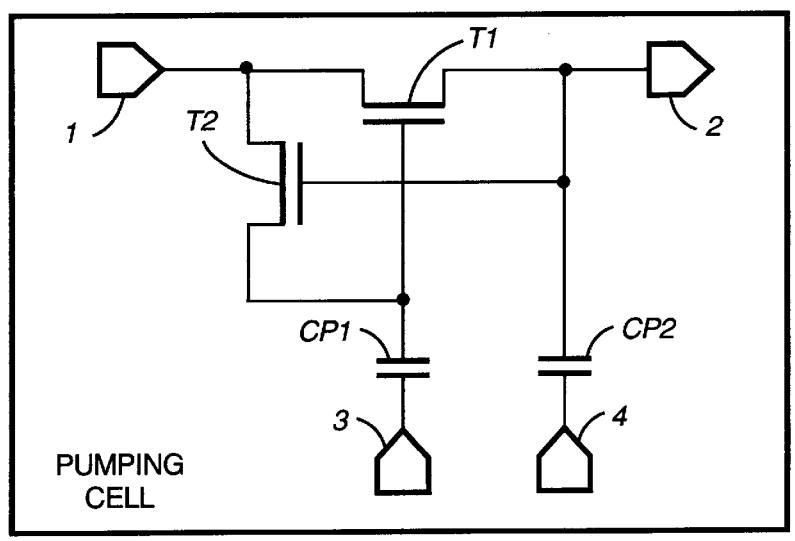
*FIG. 2*
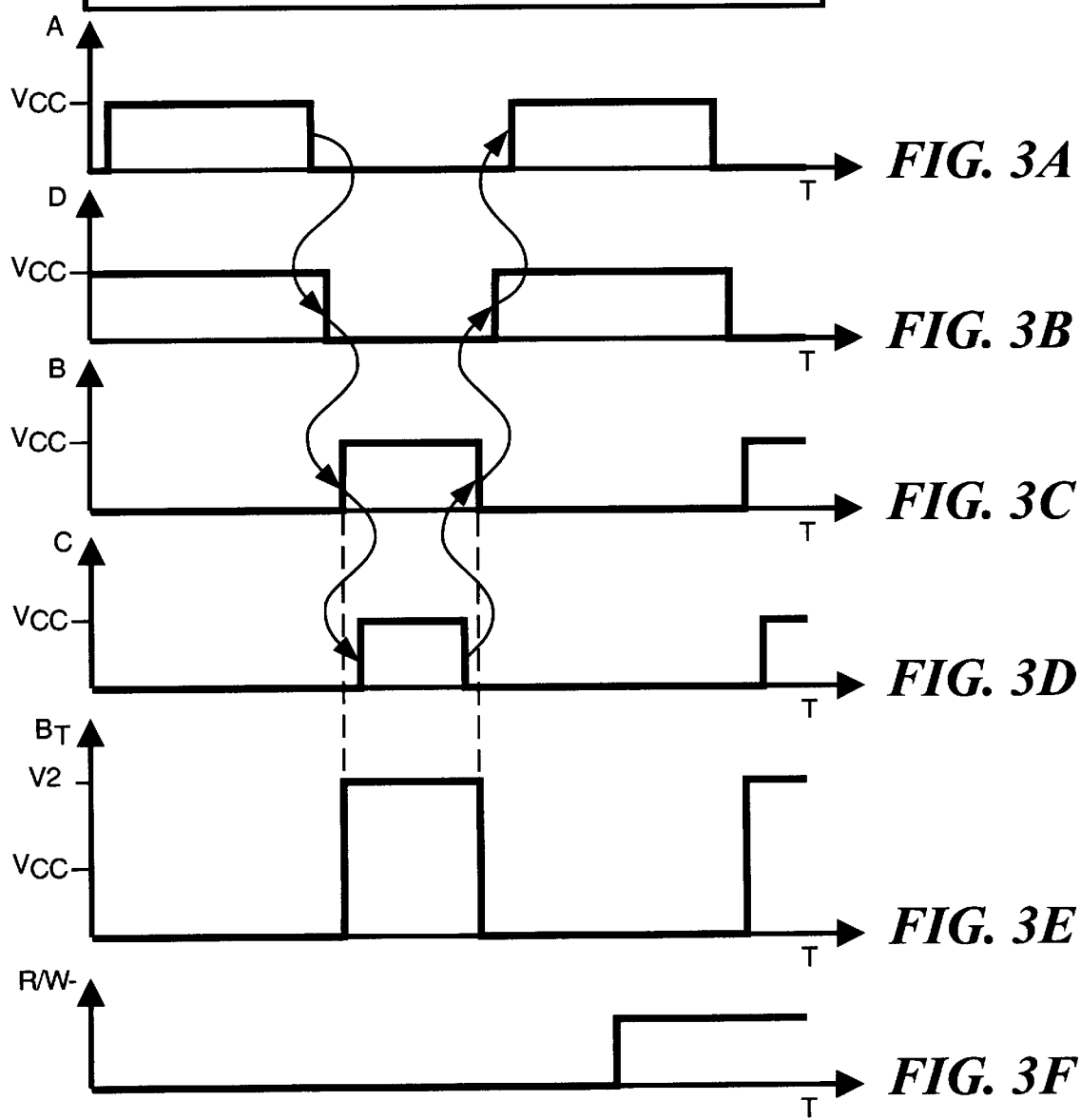
*FIG. 3A*
*FIG. 3B*
*FIG. 3C*
*FIG. 3D*
*FIG. 3E*
*FIG. 3F*

LOAD PUMP TYPE OF VOLTAGE GENERATOR CIRCUIT

CROSS-REFERENCE TO RELATED APPLICATIONS

This application is based upon and claims the benefit of priority of the prior French patent application 07 04928 filed on Apr. 16, 1997, the contents of which are hereby incorporated by reference.

BACKGROUND OF THE INVENTION

1. Field of the Invention

The present invention relates to a load pump type of voltage generator circuit and, more particularly, to a load pump designed to be used in a non-volatile memory working with a low supply voltage.

2. Description of Related Art

Load pumps are commonly used in integrated circuits for the production of a voltage greater than an initial voltage, wherein the initial voltage generally corresponds to the supply voltage of the integrated circuit.

The voltage produced by a load pump is obtained by the transfer of electric charges by pumping these charges into a plurality of series-connected capacitors that are insulated from one another by transistors or diodes. The pumping is driven by appropriate driving signals. To carry out this transfer, the load pump has elementary pumping cells comprising at least one capacitor and one transistor or one diode. The driving signals are usually two in number if the capacitors are insulated by diodes and four in number if they are insulated by transistors. The structure of such load pumps is well known and is described in the U.S. Pat. No. 5,077,691.

For an integrated circuit, it may sometimes be necessary to produce several levels of voltage. For example, in the case of a non-volatile memory with a 1.8 volt supply, it is necessary to produce a voltage of about 5 volts to read the cells of the memory and a voltage of about 10 to 12 volts to write in these cells.

The wide range of voltages to be provided for the circuit generally leads to a great increase in the number of load pumps. Accordingly, there is a need for a load pump type of voltage generator device that overcomes this shortcoming.

SUMMARY OF THE INVENTION

An object of the invention is a load pump type of voltage generator circuit designed to produce several levels of voltage higher than a supply voltage of the circuit, said circuit comprising an output stage and a plurality of pumping cells, each controlled by at least one clock signal called a driving signal, and wherein each elementary cell comprises a signal input, one driving input per driving signal to receive the driving signal or signals, and a signal output.

According to the invention, a voltage generator circuit comprises a plurality of elementary cells. These cells are distributed into two groups, each designed to produce a given level of voltage and for adding up two levels of voltage given by two groups of cells when a higher level of voltage is desired. With this structure, the load pump is capable of delivering three different levels of voltage. The voltage generator circuit comprises first and second cascades of pumping cells, in which said pumping cells are series-connected, said first and second cascades respectively delivering a first level of voltage and a second level of voltage higher than the supply voltage of the circuit. The voltage generator circuit further comprises a conversion circuit to convert the driving signal or signals assigned to the last cell of the first cascade and to deliver, in its place, a converted driving signal whose amplitude is equal to the second level of voltage so that the first cascade delivers a third level of voltage equal to the sum of the first and second levels of voltage.

According to this embodiment, the driving signal or one of the driving signals assigned to the last cell of the first cascade is modified in order to add the first and second levels of voltage together.

According to a different embodiment, it is planned to produce the third level of voltage by means of two distinct conversion circuits. Thus, the invention also relates to a load pump type of voltage generator circuit designed to produce several levels of voltage higher than a supply voltage of the circuit, said circuit comprising an output stage and elementary pumping cells each controlled by at least one clock signal called a driving signal, each elementary cell comprising a signal input, one driving input per driving signal to receive the driving signal or signals and one signal output, wherein said voltage generator circuit comprises first and second cascades of elementary pumping cells, in which said elementary pumping cells are series-connected, said first and second cascades respectively delivering a first level of voltage and a second level of voltage higher than the supply voltage of the circuit, and wherein said voltage generator circuit further comprises:
a driving signal generation unit for the generation, from the driving signal or from one of the driving signals assigned to the last cell of the first and second cascades, said driving signal having pulses with a duration T, a first driving signal whose pulses have a duration T1 and a second driving signal whose pulses have a duration T2, the leading edge of the first driving signal and the trailing edge of the second driving signal corresponding to the leading edge and to the trailing edge of said driving signal and the periods T1 and T2 meeting the condition T=T1+T2,
a first conversion circuit to convert said driving signal into a first converted driving signal having the same form as said first driving signal and having its amplitude pulses equal to the second level of voltage, and a second conversion circuit to convert said second driving signal into a
second converted driving signal having the same form as said second driving signal and having its amplitude pulses equal to the first level of voltage.

According to this embodiment, the third level of voltage is produced by the first cascade during the period TI and by the second cascade during the period T2.

In the particular case of non-volatile memories, in addition to the need to see to the size of the load pump, there are also imperatives of speed. In this type of circuit, the read voltage of 5 volts must be produced at relatively high speed so as not to penalize the time of access to the data of the memory.

To this end, it is therefore planned to fix the number of elementary pumping cells as being the same in each of the cascades and to make these two cascades work in parallel to produce the read voltage. Thus, the first and second cascade of elementary cells will simultaneously deliver an equivalent level of voltage and will work together to charge the equivalent capacitor of the bit lines connected to the pump output at greater speed.

BRIEF DESCRIPTION OF THE DRAWINGS

Other features and advantages of the present invention shall appear from the following detailed description, made with reference to the appended drawings, of which:

FIG. 2 shows a schematic of an elementary pumping cell of the circuit of FIG. 1;

FIGS. 3A to 3F show the timing diagrams of the driving signals of the circuit of FIG. 1;

DETAILED DESCRIPTION OF AN EMBODIMENT

Figure 1:
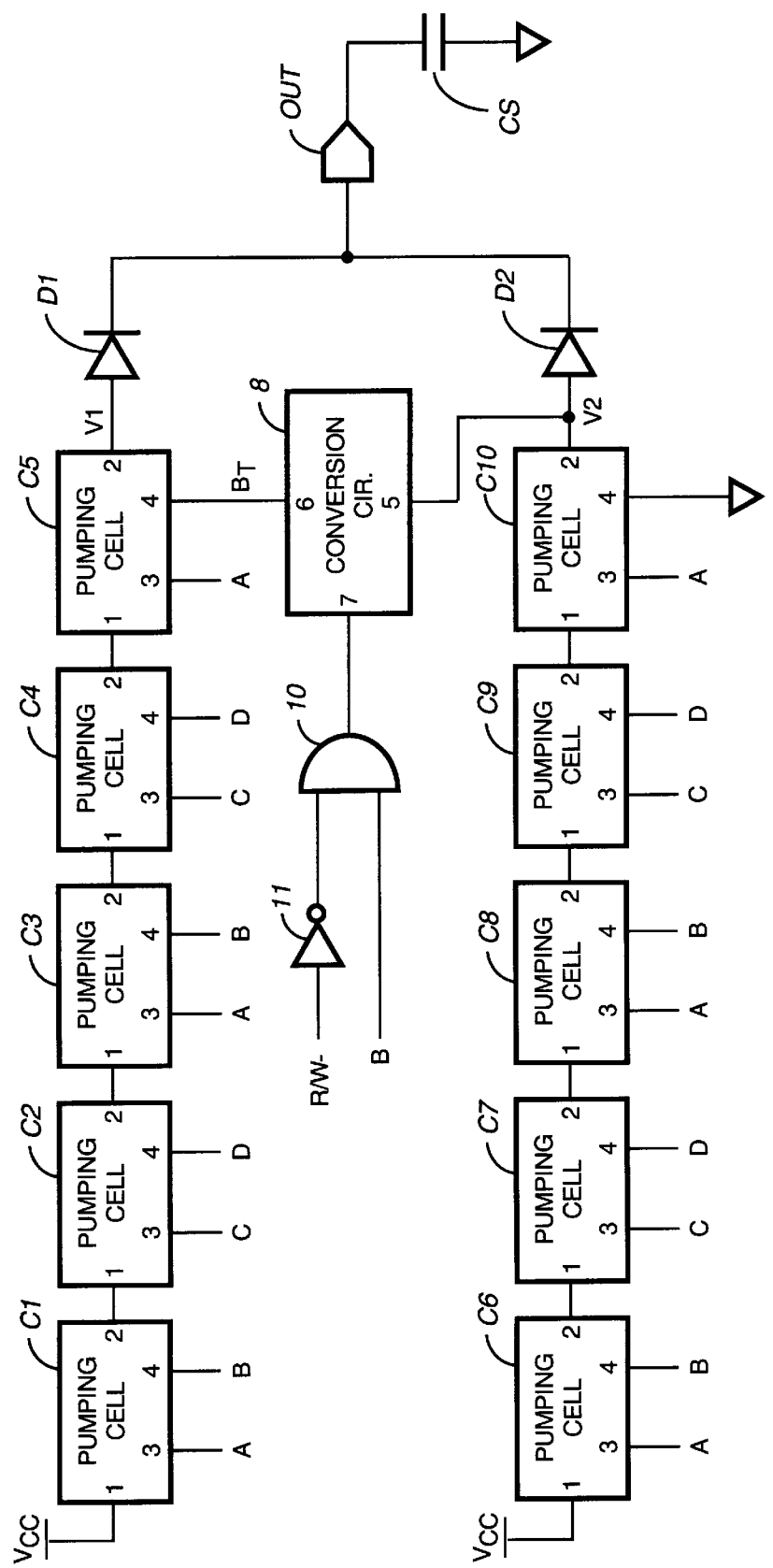
FIG. 1 is block diagram of a first embodiment of a voltage generator circuit according to the invention.

FIG. 1 shows a first embodiment of a load pump type of voltage generator circuit according to the invention. This circuit is especially adapted for non-volatile memories supplied with a low voltage of abut 1.8 volts. It is therefore designed to produce a voltage of 5 volts for the reading of the memory cells and a voltage of 10 volts for the write operations.

The circuit has two identical cascades of cells each comprising five elementary pumping cells that are series-connected. Since the two cascades are identical, they will be capable of working in parallel during a fast mode known as the read mode and thus be capable of producing the read voltage at higher speed. In a more general case, it will be possible to provide for the use of two different cascades. However, it will then no longer be possible to make the circuit work in fast mode.

The circuit of FIG. 1 comprises ten elementary pumping cells C1 to C10. The first cascade brings together the cells C1 to C5. Each cell has one signal input 1, two driving inputs 3 and 4, and one signal output 2. Since the cells in each cascade are series-connected, the output 2 of each of the cells C1 to C4 is connected respectively to the signal input 1 of each of the cells C2 to C5. Furthermore, the input 1 of the cell C1 is connected to a supply terminal Vcc of the memory while the output 2 of the cell C5 is connected to an output terminal OUT of the circuit by means of a diode D1. The diode D1 is interposed between the output 2 of the cell C5 and the output OUT to prevent any transfer of charges from the output OUT to the cell C5. Thus, the anode of the diode D1 is connected to the output 2 of the cell C5 while the cathode is connected to the output OUT. In read mode, the first cascade gives a level of voltage V1 available at the output 2 of the cell C5.

The second cascade, which in this embodiment is identical to the first cascade, brings together the elementary pumping cells C6 to C10 and the output 2 is connected to the output OUT by means of a diode D2. The second cascade produces a second level of voltage V2 which is equal to V1.

Driving signals A, B, C and D (shown in FIGS. 3A to 3F) are planned to control the different elementary pumping cells. These signals are applied to the driving inputs 3 and 4 of each of the cells. Thus, the driving signals A and B are applied to the inputs 3 and 4 of the cells C1, C3, C6 and C8 while the driving signals C and D are applied to the inputs 3 and 4 of the cells C2, C4, C7 and C9. The driving signal A is also applied to the input 3 of the cells C5 and C10 and the input 4 of the cell C10 is connected to the ground.

Furthermore, the output OUT of the load pump is connected to a capacitor Cs corresponding to the equivalent capacitance of the bit lines of the memory, which are connected to the memory cells to be read, programmed or erased.

Finally, a conversion circuit 8 provides a converted driving signal $B_T$, which is applied to the input 4 of the cell C5 of the first cascade. The conversion circuit 8 has a voltage level input 5 connected to the output 2 of the cell C10, a signal input 7 connected to the output of a NAND type logic gate 10 and a signal output 6 connected to the driving input 4 of the cell C5. The gate 10 receives, at a first input, the driving signal B and, at a second input, a read/write signal R/W- that is inverted beforehand by an inverter gate 11. The signal R/W-will define the mode of operation of the circuit of the invention. In read mode, the two cascades will work in parallel and will both contribute to charging the output capacitor Cs. In write mode, the level of voltage V2 obtained at the output of the last cell of the second cascade is used to shift the level of voltage V1 and obtain, at the output of the first cascade, a level of voltage V1+V2.

Referring to FIG. 2, to provide for a clearer understanding of the working of each cascade of cells, the diagram of an elementary pumping cell is given in FIG. 2. It comprises:

(1) an N type transistor T1 having its drain connected to the signal input 1 and its source connected to the signal output 2, said transistor working as a switch, (2) an N type transistor T2 having its drain connected to the signal input 1, its source connected to the gate of the transistor Ti and its gate connected to the signal output 2, said transistor enabling the drain-source voltage of the transistor T1 to be limited, (3) a capacitor CP1 connected between the gate of the transistor T1 and the driving input 3, and (4) a capacitor CP2 connected between the signal output 2 and the driving input 4.

In practice, the capacitors CP1 and CP2 are formed by means of N type transistors whose source and drain have been connected together.

The level of voltage at output of the two cascades is obtained by consecutively charging and discharging the capacitors CP2 of the elementary cells. The charging and discharging of the capacitors CP2 of the pumping cells C1 to C4 and C6 to C9 are controlled by the driving signals A, B, C and D shown in FIGS. 3A to 3D. Electrical charges are transferred from the signal input 1 to the capacitor CP2 during the high level of the driving signal (A or C) applied to the driving input 3 of the cell, the transistor T1 being on. On the leading edge of the driving signal (B or D) applied to the driving input 4 of the cell, the voltage at the output to the cell increases by about Vcc-Vt.

It will be observed that two successive cells receive signals of opposite polarities at their driving inputs 3 and 4. The capacitor CP2 of each cell is then linked alternately to that of the previous cell and that of the next cell. Thus, electrical charges are gradually transferred from one cell to another.

The elementary pumping cells C5 and C10 are controlled in a slightly different way. The cell C5 receives the driving signal A at its driving input 3 and the driving signal $B_T$ at its driving input 4. The driving signal $B_T$ is produced by the conversion circuit 8 and shown in FIG. 3E. During the write mode, namely when the signal R/W-shown in FIG. 3F has a low level, the driving signal $B_T$ is identical to the driving signal B apart from the fact that the pulses then have an amplitude equal to the level of voltage V2 given by the second cascade. During the read mode, namely when the signal R/W-shown in FIG. 3F has a high level, the signal BT is zero. As for the cell C10, it receives the driving signal A at its driving input 3 and its driving input 4 is permanently connected to the ground. The cell C10 is therefore permanently equivalent to a switch controlled by the driving signal A.

The circuit of FIG. 1 works as follows: in read mode, the signal $B_T$ has no pulse and the cell C5 then has the same behavior as the cell C10. Since each of the two cascades consists of the same number of cells, they both give the same level of voltage which is chosen, in the present case, to be equal to the read voltage of a memory cell, namely about 5 volts. The two cascades therefore participate simultaneously in the charging of the output capacitor Cs. In write mode, the signal $B_T$ has amplitude pulses equal to V2. On a leading edge of the signal $B_T$, the level of voltage at the output of the first cascade then becomes equal to V1+V2, i.e. about 10 volts. The diode D2 is then off so that the second cascade does not disturb the transfer of the electrical charges coming from the first cascade to the output capacitor Cs.

Figure 4:
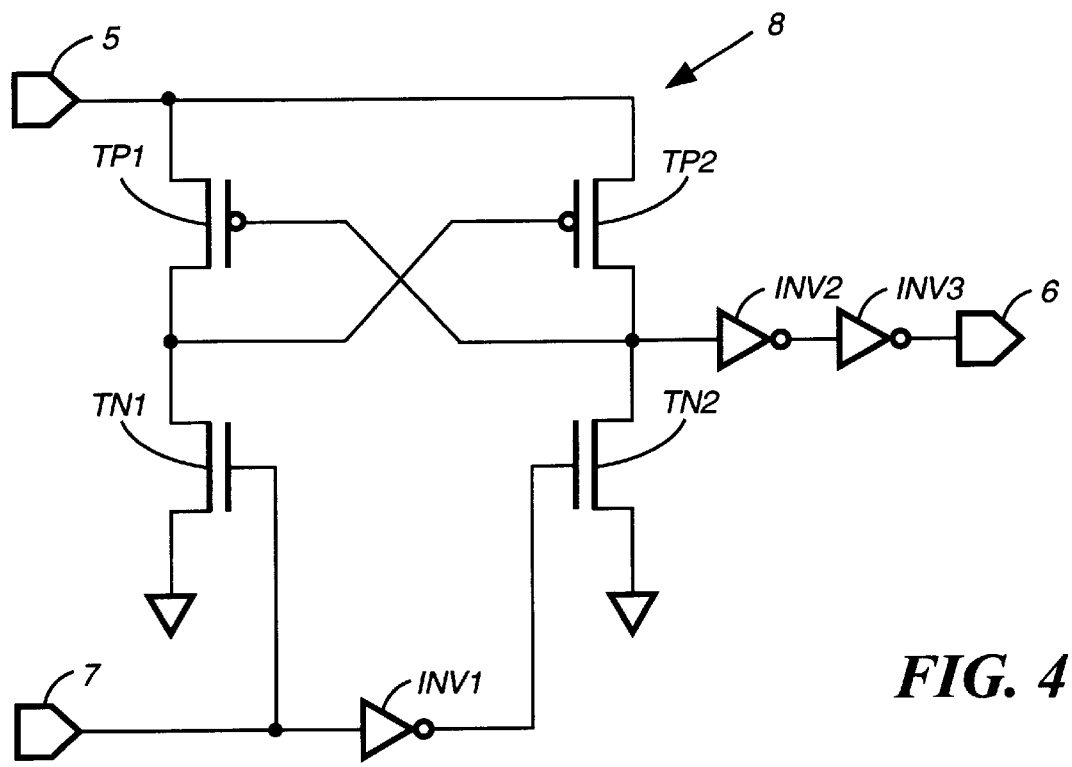
FIG. 4 is a diagram of the circuit for the conversion of the driving signals of the circuit of FIG. 1.

A diagram of the conversion circuit 8 is shown in FIG. 4. The circuit 8 is constituted chiefly by two P type transistors TP1 and TP2 and two N type transistors TN1 and TN2. The sources of the transistors TP1 and TP2 are connected to the voltage level input 5 of the conversion circuit while the sources of the transistors TN1 and TN2 are connected to the ground. The level input 5 has the role of supplying the conversion circuit 8. The drains of the transistors TN1 and TP1 are connected together. This is also the case for the drains of the transistors TN2 and TP2.

Furthermore, the gate of the transistor TP1 is connected to the drain of the transistor TN2 and the gate of the transistor TP2 is connected to the drain of the transistor TN1. The signal input 7 is connected firstly to the gate of the transistor TN1 and secondly to the gate of the transistor TN2 by means of an inverter gate INV1. Finally, the drains of the transistors TN2 and TP2 are connected to the signal output 6 by means of two inverter gates INV2 and INV3. These two inverters are aimed at regenerating the signal present at the drain of the transistor TP2. Naturally, both these inverters are supplied by the voltage applied to the voltage level input 5.

The working of such a circuit is immediate. If a voltage V2 is applied to the voltage level input 5, the pulses of the signal applied to the input 7 are copied at output and the amplitude of these pulses of the output signal is equal to V2.

Figure 5:
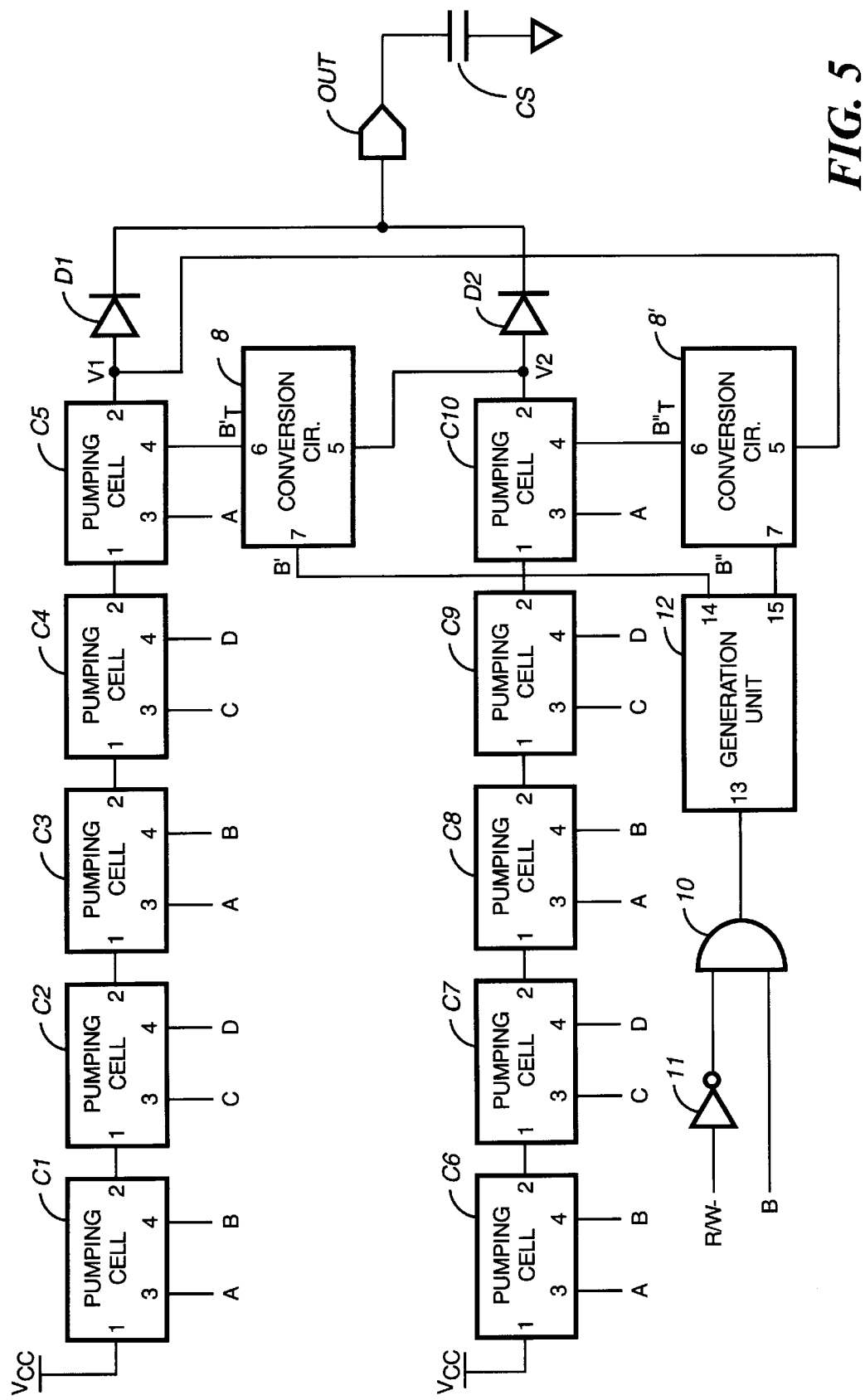
FIG. 5 shows a block diagram of a second embodiment of the voltage generator circuit according to the invention.

A second embodiment of the voltage generator circuit according to the invention is shown in FIG. 5. In this diagram, the two cascades will contribute to the alternate charging of the output capacitor Cs during the write mode.

To this end, the voltage generator circuit is complemented by a second conversion circuit 8' and by a driving signal generation unit 12. The voltage level input 5 of the second conversion circuit 8' is connected to the signal output 2 of the cell C5 and its signal output 6 is connected to the driving output 4 of the cell C10. In order that the first and second cascades may alternately give the voltage V1+V2 during the write mode, two non-overlapping signals B' and B" are applied to the signal inputs 7 of the two conversion circuits 8 and 8". These two signals B' and B" are produced by the generation unit 12. This unit is interposed between the output of the logic gate 10 and the signal inputs 7 of the conversion circuits 8 and 8'.

The unit 12 has an input 13 connected to the output of the logic gate 10 and two outputs 14 and 15 respectively connected to the signal input 7 of the first and second conversion circuit. The unit 12 has the role of producing the two non-overlapping driving signals B' and B".

Figure 6:
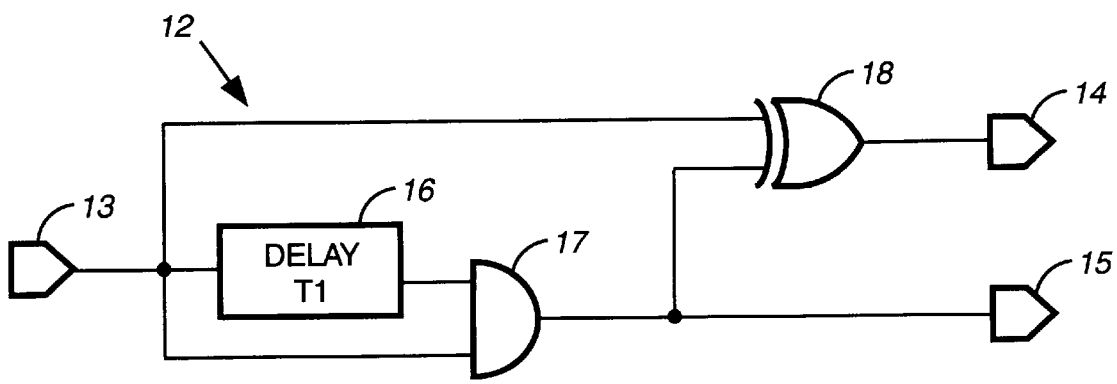
FIG. 6 is a drawing of a unit for the generation of particular driving signals of the circuit of FIG. 5.

A drawing of the generation unit 12 is shown in FIG. 6. It has a delay circuit 16 whose input is connected to the input 13 of the unit and whose output is connected to a two-input AND type logic gate 17. The signal coming from the circuit 12 therefore experiences a delay T1 with respect to the signal present at the input 13. The other input of the logic gate 17 is connected to the input 13 and its output is connected to the output 15 of the unit. The unit also has an Exclusive-OR or XOR type of logic gate 18 having its first input connected to the input 13 of the unit, its second input connected to the output of the logic gate 17 and its output connected to the output 14 of the unit.

Figure 7A:
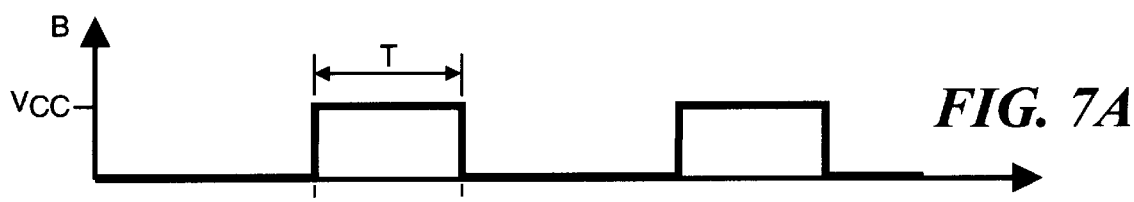
FIGS. 7A to 7F show timing diagrams of particular driving signals that come into play in the working of the circuit of FIG. 5.
Figure 7B:
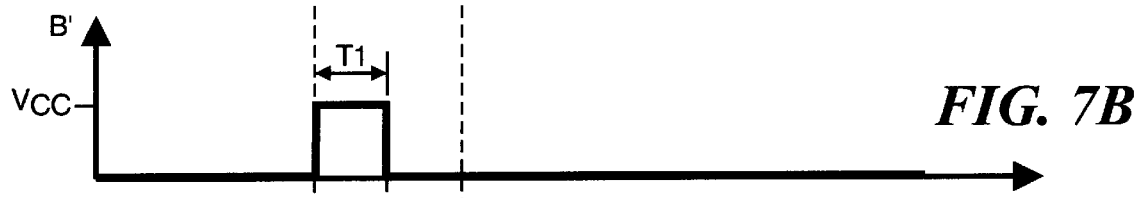
Figure 7C:

The working of this unit is illustrated in FIGS. 7A to 7F. If the driving signal B shown in FIG. 7A is applied to the first input of the logic gate 10 and the read/write signal R/W-shown in FIG. 7 is applied to the second inverted input of the logic gate 10, then the driving signal B' shown in FIG. 7B is obtained at the output 14 of the generation unit and the driving signal B' shown in FIG. 7C is obtained at the output 15. The signals B, B' and B" respectively comprise pulses with a duration T, T1 and T2 with T=T1+T2 and the leading edge of the pulses of the signal B' coincides with the leading edge of the signal B while the trailing edge of the signal B" coincides with the trailing edge of the signal B.

Figure 7D:
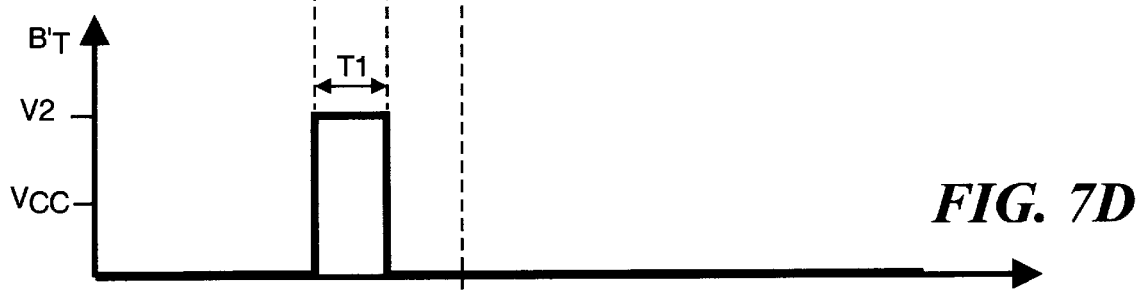
Figure 7E:
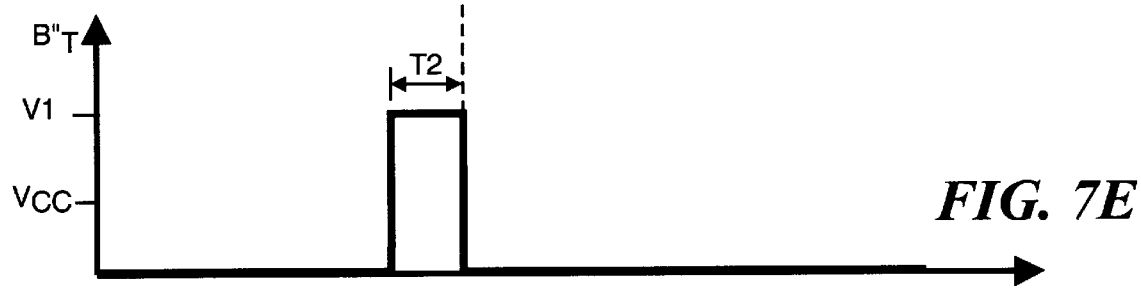
Figure 7F:
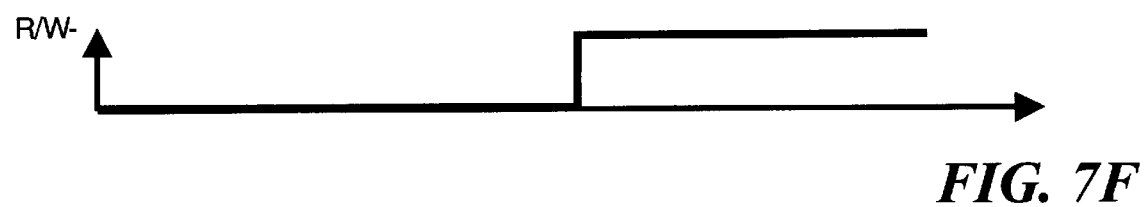

Once they are produced, the new driving signals B' and B" are then converted by the two conversion circuits to give the driving signal $B'_T$ and $B''_T$ shown in FIGS. 7D and 7E. The amplitude of the pulses of the driving signal $B_T'$ is V2 and that of the driving signal $B_T''$ is V1.

The general circuit works as follows: in read mode, the signals $B'_T$ and $B''_T$ have no pulse and the driving input 4 of the cells C5 and C10 is connected to the ground. The two cascades work in parallel and both give the read voltage. In write mode, the two cascades will alternately give the voltage V1+V2. It is the first cascade that delivers the voltage V1+V2 during the pulse of the driving signal $B'_T$. During the pulse of the driving signal $B''_T$, it is the turn of the second cascade to deliver V1+V2.

By this circuit, it is thus possible, in fast mode, corresponding to the read mode in the case of non-volatile memories, to produce a level of voltage V1 and, in a slower mode, to produce a level of voltage equal to 2*V1.

As stated here above, if V1 is different from V2, then the fast mode cannot be made to operate.

Furthermore, if it is desired to produce a "fast" voltage of 5 volts and a "slow" voltage of 12 volts, it is enough to take V1=V2=6 volts and add a regulator to the output of the circuit of the invention to limit the output voltage to 5 volts in fast mode.

What is claimed is:

1. In an electronic circuit comprising a terminal for receiving a suppy voltage, a voltage generator device for providing at least one voltage at a level higher than the supply voltage of the circuit, said voltage generator circuit comprising:

an output stage;

first and second cascades of pumping cells, wherein the pumping cells in each cascade are series-connected, said first and second cascades respectively delivering a first level of voltage and a second level of voltage higher than the supply voltage of the circuit, and wherein each of the pumping cells is controlled by at least one driving signal, and each pumping cell comprising a signal input, at least one driving input for receiving at least one driving signal and a signal output; and a conversion circuit to convert the driving signal or signals assigned to the last cell of the first cascade and to deliver, in its place, a converted driving signal whose amplitude is equal to the second level of voltage so that the first cascade delivers a third level of voltage equal to the sum of the first and second levels of voltage.

2. The voltage generator circuit of claim 1, wherein the conversion circuit further comprises:
   a signal input for receiving at least one driving signal assigned to the last cell of the first cascade;
   a voltage level input to which there is applied the second voltage level; and
   a signal output for providing said converted driving signal, wherein the converted driving signal has the same form as the driving signal and has its amplitude pulses equal to the second voltage level.

3. The voltage generator circuit of claim 2, wherein the conversion circuit comprises:
   first and second P type transistors whose sources are connected to the voltage level input of the conversion circuit, the gate of the first P type transistor being connected to the drain of the second P type transistor and the gate of the second P type transistor being connected to the drain of the first P type transistor;
   first and second N type transistors whose sources are connected to a ground connection, the drain and the gate of the first N type transistor being connected respectively to the drain of the first P type transistor and to the signal input of the conversion circuit and the drain of the second N type transistor being connected firstly to the drain of the second P type transistor and, secondly, to the signal output of the conversion circuit, and
   a first inverter whose input is connected to the signal input of the conversion circuit and whose output is connected to the gate of the second N type transistor.

4. In an electronic circuit designed to operate at a supply voltage, a voltage generator circuit for producing several levels of voltage higher than the supply voltage of the electronic circuit, said voltage generator circuit comprising:
   an output stage and a plurality of pumping cells each controlled by at least one clock signal called a driving signal, each cell comprising a signal input, one driving input per driving signal to receive the driving signal or signals and one signal output,
   first and second cascades of pumping cells, in which said pumping cells being series-connected, said first and second cascades respectively delivering a first level of voltage and a second level of voltage higher than the supply voltage of the circuit,
   a driving signal generation unit for the generation, from the driving signal or from one of the driving signals assigned to the last cell of the first and second cascades, said driving signal having pulses with a duration T, of a first driving signal whose pulses have a duration T1 and a second driving signal whose pulses have a duration T2, the leading edge of the first driving signal and the trailing edge of the second driving signal corresponding to the leading edge and to the trailing edge of said driving signal and the periods T1 and T2 meeting the condition T=T1+T2,
   a first conversion circuit to convert said driving signal into a first converted driving signal having the same form as said first driving signal and having its amplitude pulses equal to the second level of voltage, and
   a second conversion circuit for converting said second driving signal into a second converted driving signal having the same form as said second driving signal and having its amplitude pulses equal to the first level of voltage.

5. The voltage generator circuit according to claim 4, wherein the output stage of the circuit comprises:
   a first diode whose anode is connected to the signal output of the last cell of the first cascade of elementary cells and whose cathode is connected to an output terminal of the circuit, and
   a second diode whose anode is connected to the signal output of the last cell of the second cascade of elementary cells and whose cathode is connected to said output terminal of the circuit.

6. The voltage generator circuit of claim 5, wherein the conversion circuits comprise:
   first and second P type transistors whose sources are connected to the voltage level input of the conversion circuit, the gate of the first P type transistor being connected to the drain of the second P type transistor and the gate of the second P type transistor being connected to the drain of the first P type transistor;
   first and second N type transistors whose sources are connected to a ground connection, the drain and the gate of the first N type transistor being connected respectively to the drain of the first P type transistor and to the signal input of the conversion circuit and the drain of the second N type transistor being connected firstly to the drain of the second P type transistor and, secondly, to the signal output of the conversion circuit, and
   a first inverter whose input is connected to the signal input of the conversion circuit and whose output is connected to the gate of the second N type transistor.

7. The voltage generator circuit of claim 5, wherein the output stage of the circuit comprises:
   a first diode whose anode is connected to the signal output of the last cell of the first cascade of elementary cells and whose cathode is connected to an output terminal of the circuit, and
   a second diode whose anode is connected to the signal output of the last cell of the second cascade of elementary cells and whose cathode is connected to said output terminal of the circuit.

8. The voltage generator circuit of claim 4, wherein the conversion circuits comprise:
   first and second P type transistors whose sources are connected to the voltage level input of the conversion circuit, the gate of the first P type transistor being connected to the drain of the second P type transistor and the gate of the second P type transistor being connected to the drain of the first P type transistor;
   first and second N type transistors whose sources are connected to a ground connection, the drain and the gate of the first N type transistor being connected respectively to the drain of the first P type transistor and to the signal input of the conversion circuit and the drain of the second N type transistor being connected firstly to the drain of the second P type transistor and, secondly, to the signal output of the conversion circuit, and
   a first inverter whose input is connected to the signal input of the conversion circuit and whose output is connected to the gate of the second N type transistor.

9. The voltage generator circuit of claim 4, wherein the generation unit comprises:
   an input terminal, for receiving an input signal, and first and second output terminals,
   a delay circuit having an input connected to the input terminal, a NAND type logic gate whose two inputs are connected respectively to the input terminal and to the output of the delay circuit, and whose output is connected to the second output terminal, and an XOR type logic gate having its inputs connected respectively to the input terminal and to the output of the NAND type logic gate, and whose output is connected to the first output terminal.

10. The voltage generator circuit of claim 9, wherein the conversion circuit further comprises second and third series-connected inverters that are interposed between the drain of the second N type transistor and the signal output of the conversion circuit.

11. The voltage generator circuit of claim 9, wherein the first and second cascades comprise the same number of elementary cells.

12. The voltage generator circuit of claim 4 wherein the first conversion circuit comprises:

a signal input to which said first driving signal is applied, a level input to which the second voltage level is applied, and a signal output delivering a first converted driving which has the same shape as said first driving signal and has its amplitude pulses equal to the second voltage level, and wherein the second conversion circuit comprises:

a signal input to which said second driving signal is applied, a voltage level for receiving the first voltage level, and a signal output delivering a second converted driving signal which has the same form as said second driving and has its amplitude pulses equal to the first voltage level.

13. The voltage generator circuit of claim 4 wherein, in a fast operating mode, the first and second cascades work in parallel to charge an output capacitor connected to the output terminal of the circuit.

* * * * *